US012798170B2

(12) United States Patent
Wurster

(10) Patent No.: US 12,798,170 B2
(45) Date of Patent: Nov. 17, 2026

(54) TWO-STEP HDPE PREFORM AND CONTAINER WITH HIGH AXIAL STRETCH RATIO

(71) Applicant: AMCOR RIGID PACKAGING USA, LLC, Ann Arbor, MI (US)

(72) Inventor: Michael Wurster, Chelsea, MI (US)

(73) Assignee: AMCOR RIGID PACKAGING USA, LLC, Manchester, MI (US)

( * ) Notice: Subject to any disclaimer, the term of this patent is extended or adjusted under 35 U.S.C. 154(b) by 94 days.

(21) Appl. No.: 18/570,209

(22) PCT Filed: Jun. 29, 2021

(86) PCT No.: PCT/US2021/039503
§ 371 (c)(1),
(2) Date: Dec. 14, 2023

(87) PCT Pub. No.: WO2023/277874
PCT Pub. Date: Jan. 5, 2023

(65) Prior Publication Data

US 2024/0278477 A1 Aug. 22, 2024

(51) Int. Cl.
*B29C 49/06* (2006.01)
*B29C 49/00* (2006.01)
(Continued)

(52) U.S. Cl.
CPC .......... *B29C 49/06* (2013.01); *B29C 49/0005* (2013.01); *B29C 49/10* (2013.01);
(Continued)

(58) Field of Classification Search
CPC ... B29C 55/28; B29C 49/071; B29C 49/0871; B29C 49/0872; B29C 2031/00;
(Continued)

(56) References Cited

U.S. PATENT DOCUMENTS 10,266,299 B2 4/2019 Darr et al.
2012/0308689 A1 12/2012 Poulat et al.
(Continued)

FOREIGN PATENT DOCUMENTS

EP 2544874 B1 11/2014
EP 2168752 B1 1/2015
(Continued)

OTHER PUBLICATIONS

International Search Report and Written Opinion issued in International Patent Application No. PCT/US2021/039503, mailed Mar. 23, 2022; ISA/KR.
(Continued)

*Primary Examiner* — Monica A Huson
(74) *Attorney, Agent, or Firm* — Harness, Dickey & Pierce, P.L.C.

(57) ABSTRACT

A method for forming a container from a high-density polyethylene preform by one-step or two-step injection stretch blow molding. The method includes inserting the preform in a mold. The preform has a preform axial length. The method further includes blow-molding the preform into the mold to form the container, including stretching the preform to form the container with a container axial length that is 2.5-5 times greater than the preform axial length.

13 Claims, 6 Drawing Sheets

(51) Int. Cl.

| | |
|---|---|
| ***B29C 49/10*** | (2006.01) |
| *B29K 23/00* | (2006.01) |
| *B29K 105/00* | (2006.01) |
| *B29L 31/00* | (2006.01) |
| *B65D 1/02* | (2006.01) |

(52) U.S. Cl.
CPC *B29K 2023/065* (2013.01); *B29K 2105/0094* (2013.01); *B29K 2995/0063* (2013.01); *B29L 2031/7158* (2013.01); *B65D 1/0246* (2013.01)

(58) Field of Classification Search
CPC ..... B29C 49/06; B29C 49/0005; B29C 49/10; B29C 2949/0821; B29C 2949/0723; B29C 2949/0835; B29C 2949/0822; B29C 2949/0826; B29C 2949/0715; B29C 2949/0724; B29C 2049/023; B29C 2949/0811; B29C 2949/0817; B29C 2049/024; B29C 2949/0872; B29K 2023/00; B29K 2105/0094; B29K 2223/0658; B29K 2995/0063; B29K 2023/065; B29L 2031/7158; B65D 1/0246
See application file for complete search history.

(56) References Cited

U.S. PATENT DOCUMENTS

| | | | | |
|---|---|---|---|---|
| 2013/0214460 | A1 * | 8/2013 | Rogers | ................ B29C 49/0006 264/537 |
| 2024/0278477 | A1 | 8/2024 | Wurster | |

FOREIGN PATENT DOCUMENTS

| | | | |
|---|---|---|---|
| EP | 4363192 | A1 | 5/2024 |
| JP | 6727604 | B1 | 7/2020 |
| WO | WO-02-20246 | A1 | 3/2002 |
| WO | WO-2010-039475 | A2 | 4/2010 |
| WO | WO-2017-085500 | A2 | 5/2017 |
| WO | 2020040837 | A1 | 2/2020 |
| WO | WO-2023277874 | A1 | 1/2023 |

OTHER PUBLICATIONS

Canadian Office Action from counterpart application No. 3,222,206, dated Dec. 3, 2025.
Colombian Office Action for counterpart application No. NC20230018272, dated May 7, 2026.
Extended European Search Report from counterpart EP219486271, dated Jan. 31, 2025.

* cited by examiner

TWO-STEP HDPE PREFORM AND CONTAINER WITH HIGH AXIAL STRETCH RATIO

CROSS-REFERENCE TO RELATED APPLICATION

This application is a U.S. National Phase Patent Application under 35 U.S.C. 371 of International Application No. PCT/US2021/039503, filed on Jun. 29, 2021, the entire disclosure of which is incorporated herein by reference.

FIELD

The present disclosure relates to an injection stretch blow molded HDPE preform and container with a high axial stretch ratio.

BACKGROUND

This section provides background information related to the present disclosure, which is not necessarily prior art.

The present disclosure is directed to methods for producing larger size high density polyethylene (HDPE) containers using an injection stretch blow molding process (ISBM), and higher than traditionally used axial preform-to-container stretch ratios. This provides numerous benefits, such as reduced container weights, lower blow molding air pressure, longer preform heating time window, and increased blow molding throughput as compared to other molding technologies, such as extrusion blow molding (EBM).

While current preforms, containers, and methods for forming containers from preforms are suitable for their intended use, they are subject to improvement. The present disclosure provides for improved preforms, containers, and forming methods including at least the features and advantageous set forth herein.

SUMMARY

This section provides a general summary of the disclosure, and is not a comprehensive disclosure of its full scope or all of its features.

The present disclosure provides for a method for forming a high density polyethylene (HDPE) container from a preform by injection stretch blow molding. The method includes inserting the preform in a blow mold. The preform has a preform axial length. The method further includes blow-molding the preform into the mold to form the container, including stretching the preform to form the container with a container axial length that is 2.5-5 times greater than the preform axial length.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of select embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
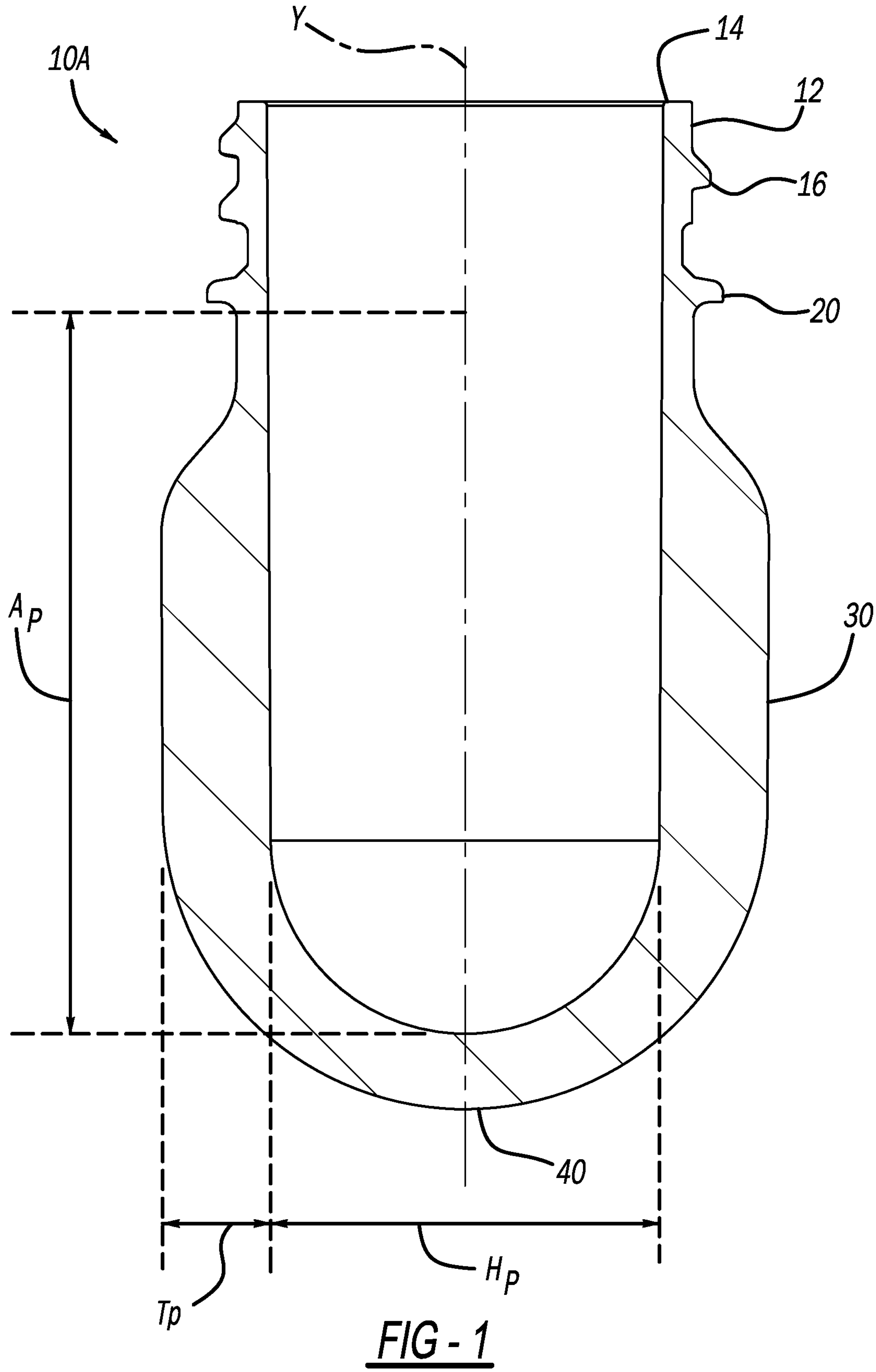
FIG. 1 is a side view of a preform in accordance with the present disclosure.

FIG. 1 illustrates an exemplary preform 10A in accordance with the present disclosure. The preform 10A is formed in any suitable manner, such as by injection molding of any suitable polymeric material into a mold. For example, the preform 10A may be formed by injecting high density polyethylene (HDPE) resin into a mold corresponding to the size and shape of the preform 10A. The HDPE resin may have a melt flow index of 1.5-2.0, and a density of 0.955-0.960 g/cm$^3$. The HDPE resin may also be bimodal, which combines high-molecular-weight (HMW) and low-molecular-weight (LMW) HDPE resins to improve the balance of processability and mechanical properties.

The preform 10A generally includes a finish 12, which defines an opening 14 of the preform 10A. At an outer surface of the finish 12 are threads 16, which are configured to cooperate with any suitable closure for closing the opening 14. The threads 16 may be external threads as illustrated, or internal threads. Below the threads 16 is a flange 20 for supporting the preform 10A in a mold when the preform 10A is blow molded into a container. For example, FIG. 2 illustrates the preform 10A seated in a mold 210 for forming exemplary container 110 of FIG. 3.

The flange 20 is between the finish 12 and a preform body 30. The preform body 30 extends to a distal end 40 of the preform 10A. A longitudinal axis Y of the preform 10A extends through an axial center of the opening 14 and the distal end 40.

The preform 10A has an axial length $A_P$, which generally extends from the flange 20 to the distal end 40 as illustrated in FIG. 1. The preform 10A may have any suitable axial length $A_P$, such as 64.16 mm. The preform 10A has a hoop diameter $H_P$ extending across the preform body 30 perpendicular to the longitudinal axis Y, as illustrated in FIG. 1. The hoop diameter $H_P$ of the preform 10A may be, for example, 34.12 mm. The preform body 30 has a thickness $T_P$ of 2.5-6.0 mm.

Figure 2:
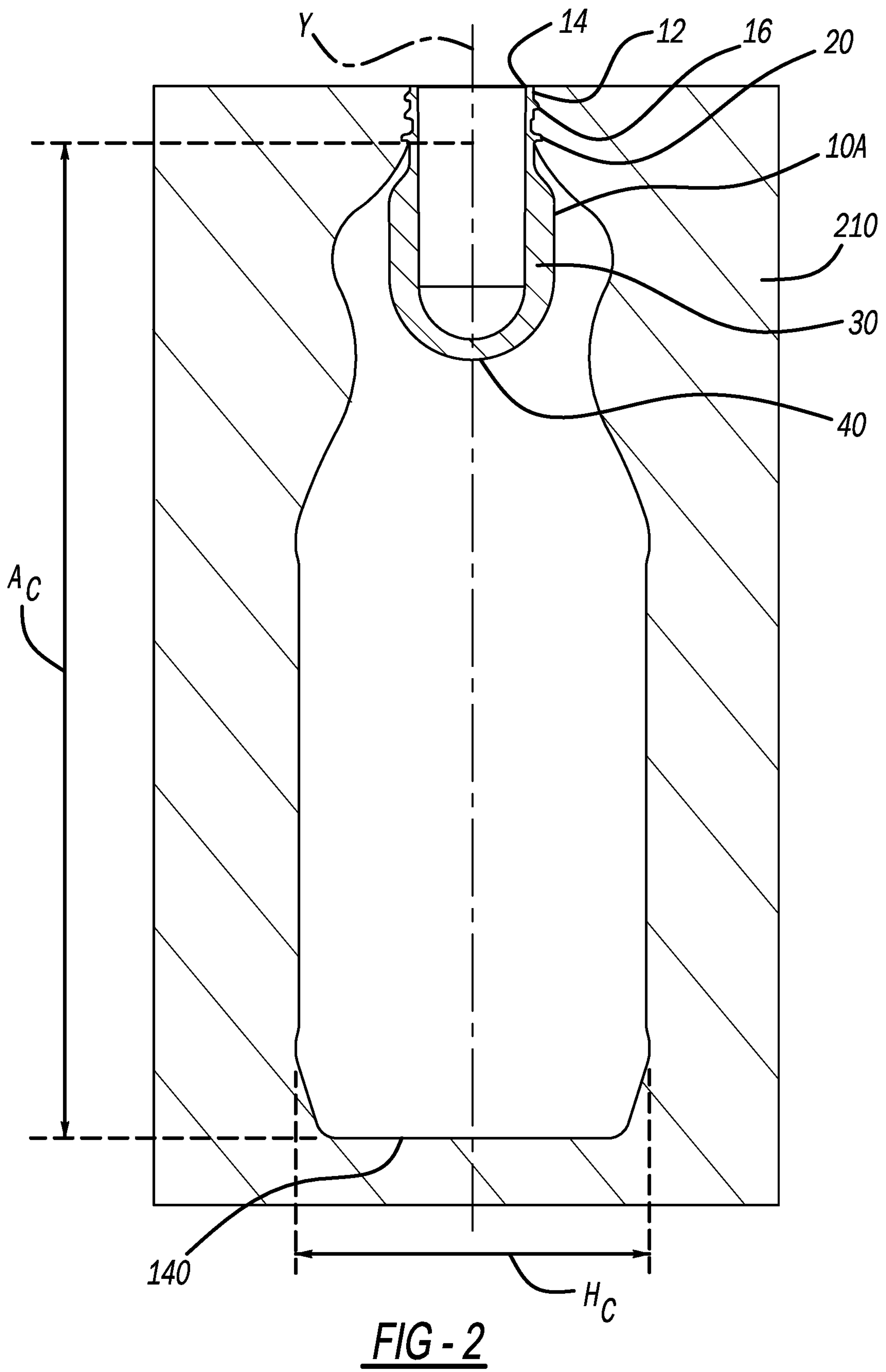
FIG. 2 illustrates the preform of FIG. 1 seated in a mold for forming a container by two-step injection stretch blow molding.
Figure 3:
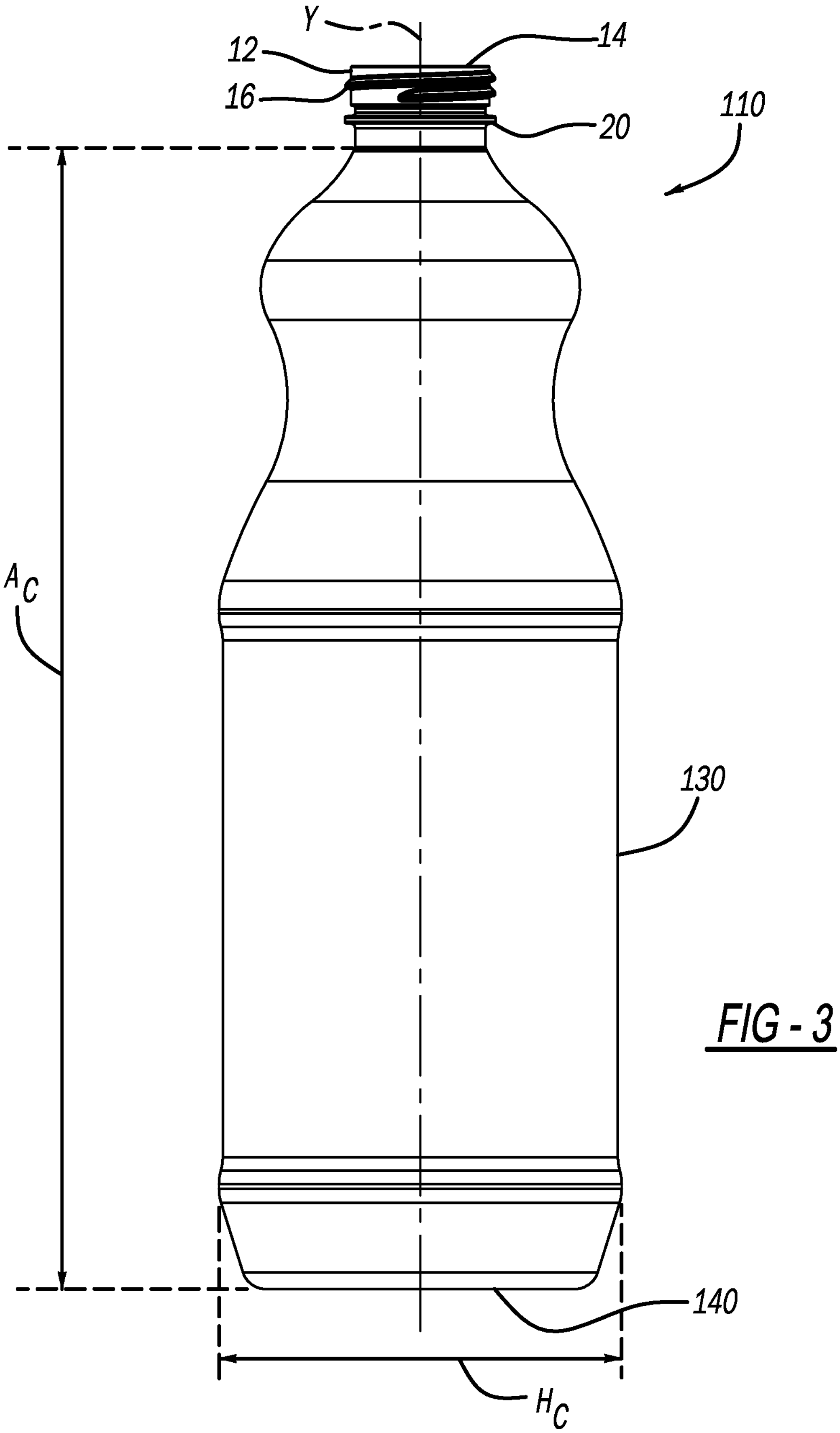
FIG. 3 is a side view of an exemplary container in accordance with the present disclosure formed from injection stretch blow molding the preform of FIG. 1 into the mold of FIG. 2.

With particular reference to FIGS. 2 and 3, the preform 10A is heated (such as to 124° C. to 133° C.) and stretched into the mold 210 to form the container 110 by injection stretch blow molding. The mold 210 may have any suitable size and shape corresponding to a desired container, such as the container 110. The container 110 includes the finish 12, as well as the opening 14, the threads 16, and the flange 20. The preform body 30 is stretched against sidewalls of the mold 210 to form a container body 130. The container base 140 is stretched to a base of the mold 210 to form the container base 140.

The resulting container 110 may have any suitable shape, such as that illustrated in FIG. 3. The container 110 may have a volume of 1 liter-2.5 liters, for example, and a weight of 29.5 g (1 liter container)-33 g (2.5 liter container), for example. Thus, the container 110 may have a container weight-volume ratio of 13-29 grams per liter, for example. The container 110 has an axial length $L_B$ extending from the base 140 to about the flange 20 of 243 mm. The container 110 has a hoop diameter $H_C$ proximate to the base 140 of 84 mm.

During blow molding of the preform 10A into the container 110, the preform 10A is stretched axially along the longitudinal axis Y at an axial stretch ratio ($A_C/A_P$) of 2.5-5. This provides the container 110 with a container axial length $A_C$ that is 2.5×-5× greater than the axial length $A_P$ of the preform 10A. The preform 10A is also stretched outward from the longitudinal axis Y at a hoop stretch ratio ($H_C/H_P$) of 2.9-4.3. Thus, the container hoop diameter $H_C$ is 2.9×-4.3× greater than the preform hoop diameter $H_P$. As the axial stretch ($A_C/A_P$) increases, the hoop stretch ($H_C/H_P$) decreases and the thickness $T_P$ of the preform body 30 decreases. The present disclosure thus provides for a total planar stretch ratio (axial stretch×hoop stretch) of 7.2-21.5 times. The thickness $T_P$ of the preform body 30 may be 2.5 mm-5.5 mm, for example. This thickness $T_P$ is thicker than existing preforms due to the relatively greater total planar stretch ratio. The preform 10A is stretched to form the container 110 with a container body thickness of 0.006" to 0.014".

The axial stretch ratio of 2.5×-5× advantageously allows the container 110, which has a capacity of 1 L-2.5 L, to be formed from the preform 10A by way of injection stretch blow molding and advantageously provides the container 110 with a weight that is about 20% less than if the container 110 was formed by extrusion blow molding (EBM). The side wall of the injection molded preform at the preform body 30 is about 16 to 28 times thicker at $T_P$ than the side wall of the resulting blow molded container 110 at the container body 130. Thus, the thickness of the sidewall of the container 110 is 16 to 28 times less than the thickness $T_P$ of the preform body 30.

The preform 10A is advantageously configured to be heated over a wide time range during blow molding while maintaining the integrity of the resulting container 110. For example, the preform 10A may be heated (such as to 124° C. to 133° C.) over a range of 200-220 secs. when the container 110 is formed of DMC-1250 HDPE from Dow Chemical Company of Midland, Michigan. This allows for larger processing windows during blow-molding, as described further therein.

The preform 10A is configured to be blown into the container 110 by injecting air into the preform 10A at less than 25 bar to provide the container 110 with an interior volume of 1 L-2.5 L. Thus, the preform 10A may be blown into the 1 L-2.5 L container 110 using relatively less air pressure than previous preforms, which advantageously conserves energy.

Figure 4:
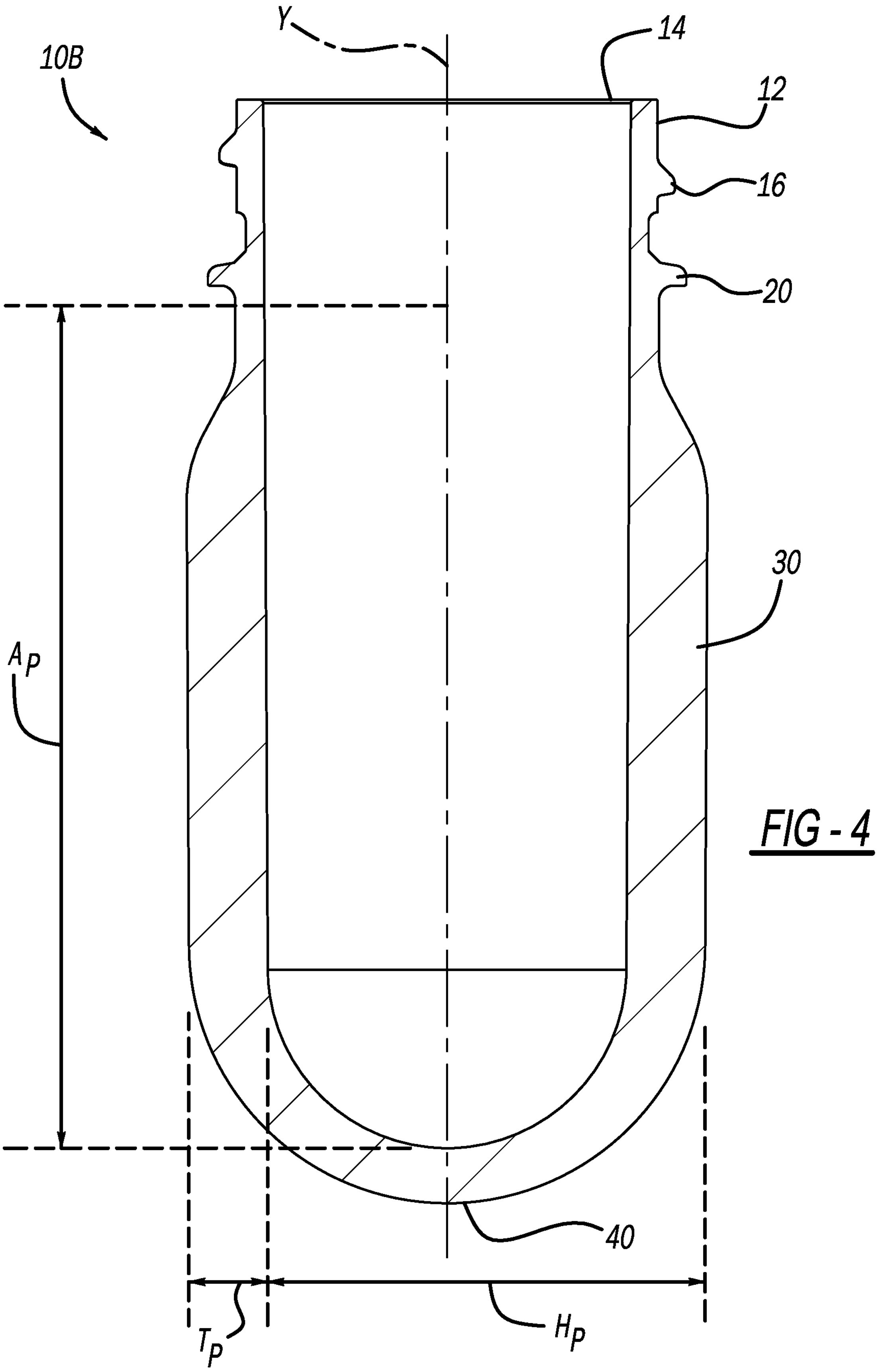
FIG. 4 is a side view of another preform in accordance with the present disclosure.

With reference to FIG. 4, another preform in accordance with the present disclosure is illustrated at reference 10B. The preform 10B is similar to the preform 10A, and thus the reference numerals used to identify the features of preform 10A are also used to identify the features of the preform 10B. The description of the preform 10A also applies to the preform 10B. The preform 10B only differs from the preform 10A with respect to the dimensions thereof. The preform 10B has the following dimensions: $A_P$: 72.61 mm; $H_P$: 32.55 mm; $T_P$: 5.14 mm. The preform 10B has a weight of 29.6 g.

Figure 5:
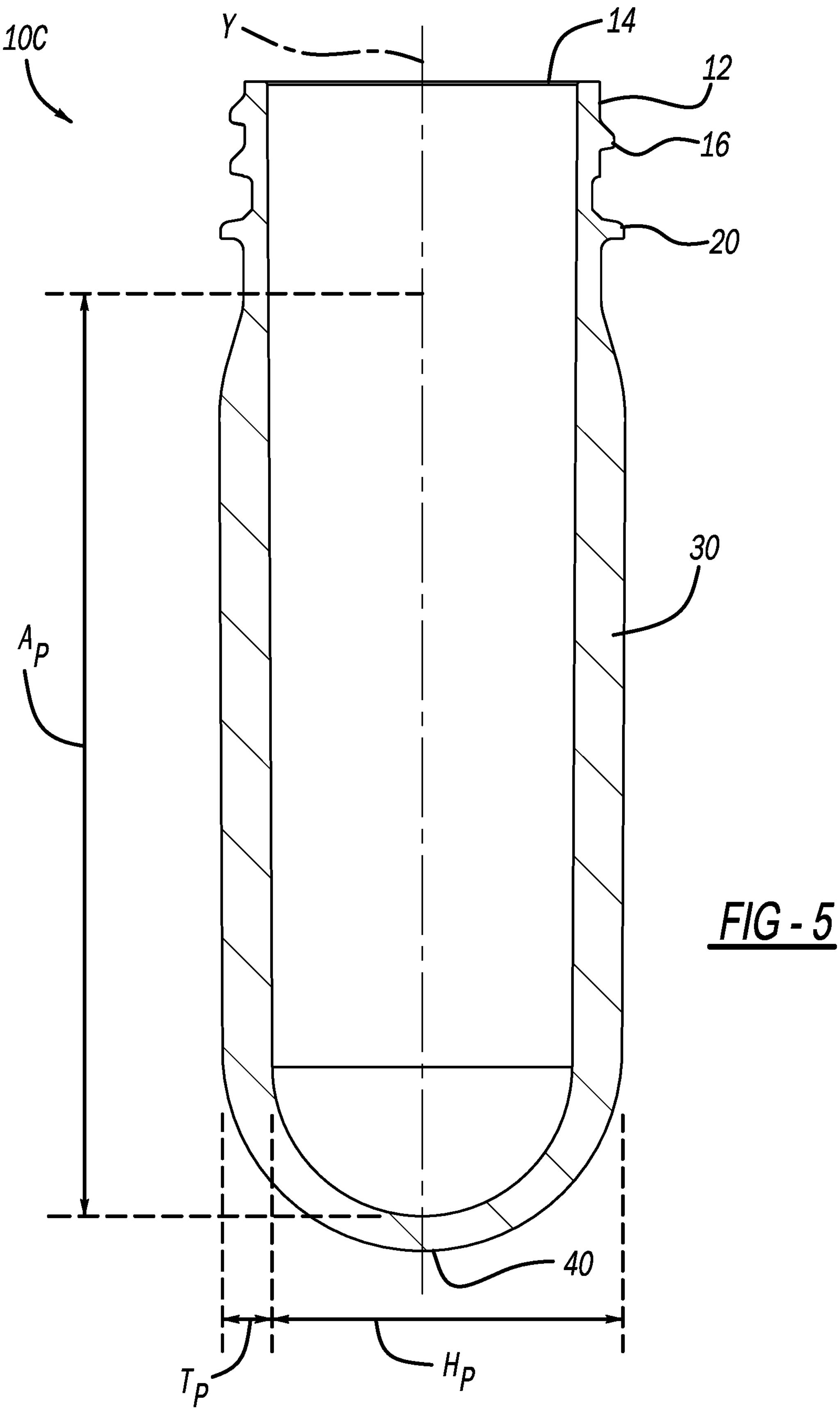
FIG. 5 is a side view of an additional preform in accordance with the present disclosure.

With reference to FIG. 5, another preform in accordance with the present disclosure is illustrated at reference 10C. The preform 10C is similar to the preform 10A, and thus the reference numerals used to identify the features of preform 10A are also used to identify the features of the preform 10C. The description of the preform 10A also applies to the preform 10C. The preform 10C only differs from the preform 10A with respect to the dimensions thereof. The preform 10C has the following dimensions: $A_P$: 83.86 mm; $H_P$: 31 mm; $T_P$: 4.42 mm. The preform 10B has a weight of 29.6 mm.

Figure 6:
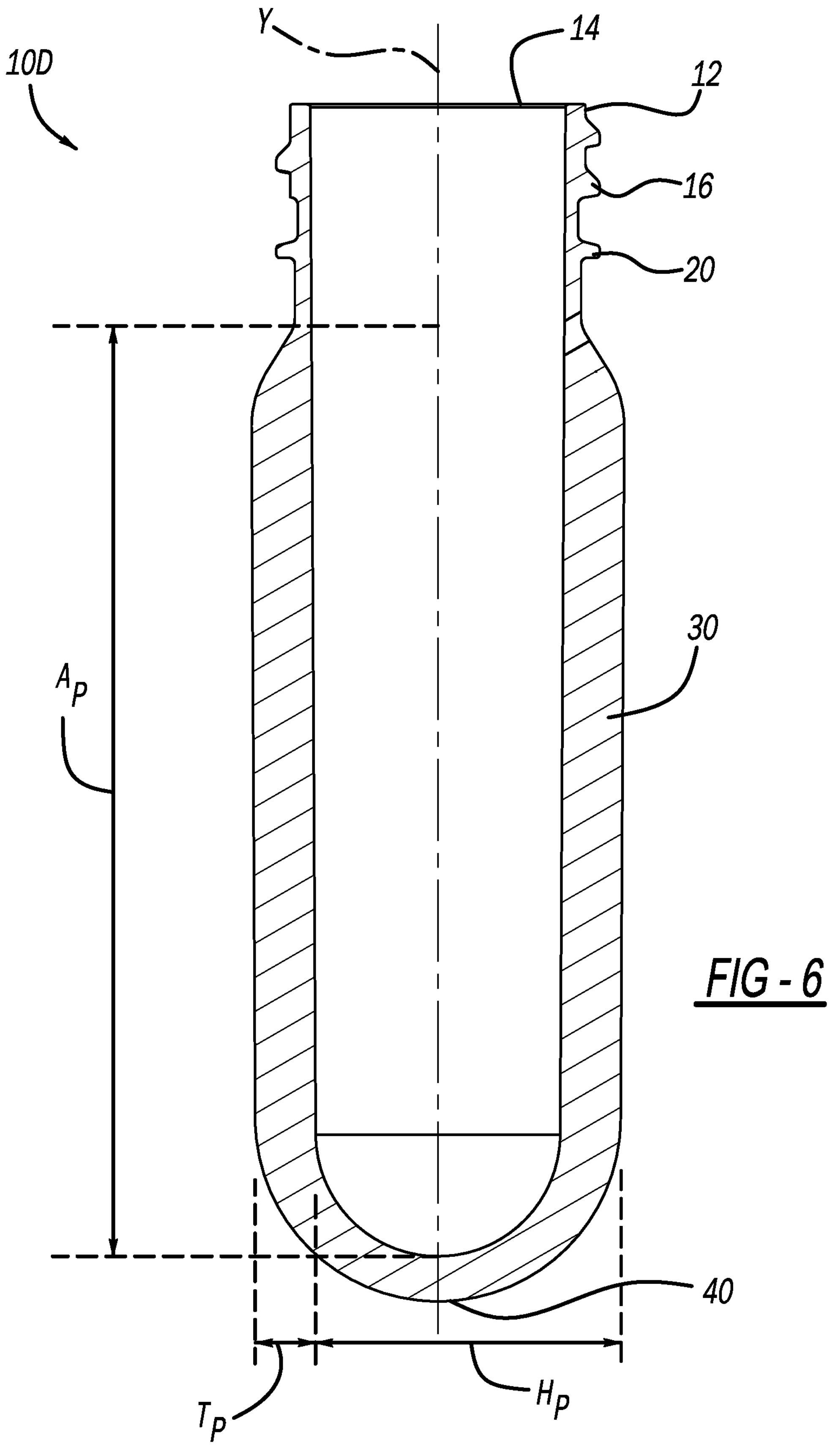
FIG. 6 is a side view of yet another preform in accordance with the present disclosure.

With reference to FIG. 6, another preform in accordance with the present disclosure is illustrated at reference 10D. The preform 10D is similar to the preform 10A, and thus the reference numerals used to identify the features of preform 10A are also used to identify the features of the preform 10D. The description of the preform 10A also applies to the preform 10D. The preform 10D only differs from the preform 10A with respect to the dimensions thereof. The preform 10D has the following dimensions: $A_P$: 88.33 mm; $H_P$: 31.56 mm; $T_P$: 5.12 mm. The preform 10D has a weight of 33 g.

The ISBM process of the present disclosure provides numerous additional advantages. For example, the injection molded preforms 10A-10D can be produced in a separate injection molding machine and later reheated and placed in blow molds of a blow molding machine where they are stretched lengthwise (axial stretch) to about twice their original length. This process is called two-step injection stretch blow molding. Alternately, preforms 10A-10D can be injection molded and placed in blow molds of the same machine where they are stretched lengthwise (axial stretch) to about twice their original length. This process is called one-step injection stretch blow molding. Compressed air is then blown into the stretched preforms 10A-10D to expand them (radial stretch) and form the final shape of the container. This is an improvement over extrusion blow molding (EBM), where plastic is melted and extruded into a hollow tube called a parison. This parison is then captured by closing it into a metal mold. Air is then blown into the parison, inflating it into the shape of the bottle.

With EBM, there is no axial stretching of the HDPE material as it is blown into the final container shape. In blow molding, the axial stretch ratio is defined as the ratio between the height of the final container and the height of the preform. EBM typically uses axial stretch rations 1:1 since there is no stretching, and traditional two-step ISBM typically uses axial stretch ratios of 2.5× or less. The axial stretch ratio of about 2.5× to about 5× of the present disclosure is higher due to the shorter preform length. The present disclosure advantageously combines the two-step process and higher axial stretch ratios of about 2.5× to about 5×, along with a preform wall thickness of 2.5 mm to 5.5 mm, to produce large HDPE bottles between 1 L and 2.5 L, which are lighter in weight with superior mechanical performance.

The weight of containers formed in accordance with the present disclosure is about 20% less than similar containers produced by EBM, and can range from about 29 g to about 33 g depending on the volume of the container. This translates to about 13-29 grams of HDPE per liter of container volume. The hoop dimension $H_C$ of containers formed in accordance with the present disclosure is lower than similar PET preforms/containers due to the preforms

10A-10D having relatively larger diameters and thicknesses resulting from a relatively shorter preform length.

The relatively shorter and thicker walls of the preforms 10A-10D allows for more flexibility in preform heating time. This is also referred to as a larger processing window, which increases container consistency and quality. In accordance with the present disclosure, the higher the stretch ratio, the larger the heating time window. For example, an axial stretch ratio of 5× results in a heating time window of 21-25 seconds. An axial stretch ratio of 4× results in a heating time window of 20-25 seconds. An axial stretch radio of 3× results in a heating time window of 11-17 seconds. An axial stretch ratio of 2.5× results in a heating time window of 3-17 seconds.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A method for forming a container from a high-density polyethylene preform by injection stretch blow molding, the method comprising:

- inserting the preform in a mold, the preform having a preform axial length; and
- blow-molding the preform into the mold to form the container, including heating and stretching the preform to form the container with a container axial length that is 2.5-5 times greater than the preform axial length;
- wherein:
  - the heating includes heating the preform for up to 25 seconds prior to stretching;
  - blow-molding the preform includes stretching the preform to form the container with a container hoop diameter that is 2.9-4.3 times greater than a preform hoop diameter of the preform;
  - blow-molding the preform includes stretching the preform to a total planar stretch ratio of 7.2-21.5 times, the total planar stretch ratio is a product of the container axial length multiplied by the container hoop diameter; and
  - wherein the preform is made of bimodal high-density polyethylene combining high-molecular-weight (HMW) and low-molecular-weight (LMW) HDPE resins.

2. The method of claim 1, wherein the injection stretch blow molding is one-step or two-step.

3. The method of claim 1, wherein blow-molding the preform includes stretching the preform to form the container with an interior volume of 1 L-2.5 L.

4. The method of claim 3, wherein blow-molding the preform includes stretching the preform to form the container with a weight of 29.5 g-33 g.

5. The method of claim 3, wherein blow-molding the preform includes stretching the preform to form the container with a weight/volume ratio of 13-29 grams/liter.

6. The method of claim 1, wherein the preform has a preform body thickness of 2.5 mm-5.5 mm.

7. The method of claim 1, wherein blow-molding the preform includes stretching the preform to form the container with a container body thickness of 0.006" to 0.014".

8. The method of claim 1, wherein blow-molding the preform includes stretching the preform to form the container with a container sidewall thickness that is 16 to 28 times less than a preform sidewall thickness of the preform.

9. The method of claim 1, wherein blow-molding the preform into the mold to form the container includes heating the preform to a temperature of 124° C. to 133° C.

10. The method of claim 1, wherein blow-molding the preform into the mold to form the container includes injecting air into the preform at less than 25 bar to form the container with an interior volume of 1 L-2.5 L.

11. The method of claim 1, further comprising injection molding the preform prior to inserting the preform into the mold.

12. The method of claim 1, wherein the preform is made of high-density polyethylene having a melt flow index of 1.5-2.

13. The method of claim 1, wherein the preform is made of high-density polyethylene having a density of 0.955-0.960 grams/$cm^3$.

* * * * *